United States Patent
Smith (10) Patent No.: US 8,935,798 B1
(45) Date of Patent: Jan. 13, 2015

(54) AUTOMATICALLY ENABLING PRIVATE BROWSING OF A WEB PAGE, AND APPLICATIONS THEREOF

(75) Inventor: Michael David Smith, Seattle, WA (US)

(73) Assignee: Google Inc., Mountain View, CA (US)

( * ) Notice: Subject to any disclaimer, the term of this patent is extended or adjusted under 35 U.S.C. 154(b) by 235 days.

(21) Appl. No.: 13/291,168

(22) Filed: Nov. 8, 2011

(51) Int. Cl.
*G06F 21/00* (2013.01)
*G06F 17/30* (2006.01)
*G06F 21/62* (2013.01)

(52) U.S. Cl.
CPC .......... *G06F 17/30* (2013.01); *G06F 17/30867* (2013.01); *G06F 17/30902* (2013.01); *G06F 21/6263* (2013.01)
USPC ........................................... 726/26; 709/219

(58) Field of Classification Search
CPC .............. G06F 17/30; G06F 17/30876; G06F 17/30902; G06F 21/6263
USPC ........................................... 726/26; 709/219
See application file for complete search history.

(56) References Cited

U.S. PATENT DOCUMENTS

| | | | |
|---|---|---|---|
| 6,510,458 B1* | 1/2003 | Berstis et al. | 709/219 |
| 2002/0191020 A1* | 12/2002 | Kaply et al. | 345/764 |
| 2012/0240237 A1* | 9/2012 | Kanevsky et al. | 726/26 |

OTHER PUBLICATIONS

DeCarlo, Mathew, "Automatically Start Your Browser in 'Private' Mode", Jun. 17, 2010, pp. 1-5.*

* cited by examiner

*Primary Examiner* — Syed Zaidi
(74) *Attorney, Agent, or Firm* — McDermott Will & Emery LLP (57) ABSTRACT

Systems, methods and computer storage mediums automatically enabling private browsing of a web page are described herein. Embodiments of the present disclosure relate to equipping a web browser with the ability to automatically open web pages in a privacy mode based on content of the web pages so that a user is not required to manually activate the privacy mode. The web browser is able to identify characteristics of the content provided by the web pages by analyzing the web pages for content that increases the likelihood that the user may require that the web page be opened in the privacy mode.

20 Claims, 4 Drawing Sheets

AUTOMATICALLY ENABLING PRIVATE BROWSING OF A WEB PAGE, AND APPLICATIONS THEREOF

BACKGROUND

A web browser tracks a user by storing information as the user browses web pages. The web browser stores information such as the browsing history of the web pages encountered by the user and also images, videos, text and any other information the user encounters while browsing the web pages. The web browser stores such information after which the information can later be retrieved.

A privacy mode for the web browser can be enabled so that the user can browse the web pages without the web browser tracking the user. The privacy mode prevents storage of information gathered from the user's browsing that could be later retrieved. The user must explicitly open a new browser window with enhanced privacy settings to activate the privacy mode. The user that opens the web browser without the enhanced privacy settings, browses web pages, and then decides after the fact to prevent the storage of the information gathered from that browsing cannot do so. The user cannot prevent the storage of information by the web browser unless the user manually opens a browser window in the privacy mode.

BRIEF SUMMARY

Embodiments of the present disclosure relate to automatic private browsing of a web page. In a first embodiment, a computer implemented method includes steps for automatically enabling private browsing of a web page in a privacy mode. A user request to open the web page can be received. A determination can be made as to whether the web page should be opened in the privacy mode. The privacy mode can be enabled to prevent storage of web page usage information generated as the user browses the web page. The web page can automatically be opened in the privacy mode so that the user is not required to activate the privacy mode.

In a second embodiment, a system provides a web page that automatically enables private browsing of a web page in a privacy mode. A user request manager receives a user request from a user to open the web page. A privacy mode enabler determines whether the web page is to be opened in the privacy mode. The privacy mode enabler enables the privacy mode to prevent storage of web page usage information generated as the user browses the web page. A web page renderer opens the web page in the privacy mode so that the user is not required to manually activate the privacy mode.

In a third embodiment, a computer storage medium encoded within a computer program where the program comprises instructions that when executed by one or more processors cause the one or more processors to perform operations to automatically enable private browsing for a web page. A web page is opened when a user request to open the web page is received. Whether the web page is to be opened in the privacy mode is determined. The privacy mode is enabled to prevent storage of web page usage information generated as the user browses the web page. The web page is automatically opened in the privacy mode so that the user is not required to manually activate the privacy mode.

Further embodiments, features, and advantages, as well as the structure and operation of the various embodiments, are described in detail below with reference to the accompanying drawings.

BRIEF DESCRIPTION OF THE DRAWINGS/FIGURES

Embodiments are described with reference to the accompanying drawings. In the drawings, like reference numbers can indicate identical or functionally similar elements.

DETAILED DESCRIPTION

This description generally relates to the field of web browsers. A user requests to open a web page in a web browser. The web browser analyzes the web page for content that may require that the web page be opened in a privacy mode preventing the storage of web page information generated as the user browses the web page. The web browser determines whether the content of the web page increases the likelihood that the user may require that the web page be opened in the privacy mode. When the web browser identifies that the content of the web page requires increased privacy, the web page automatically opens the web page in the privacy mode so that the user is not required to activate the privacy mode.

In the Detailed Description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic may be described in connection with an embodiment, it may be within the knowledge of one skilled in the art to effect such feature, structure, or characteristic in connection with other embodiments whether or not explicitly described.

The following detailed description refers to the accompanying drawings that illustrate exemplary embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the detailed description is not meant to limit the embodiments described below.

Exemplary Web Browser System Architecture

Figure 1:
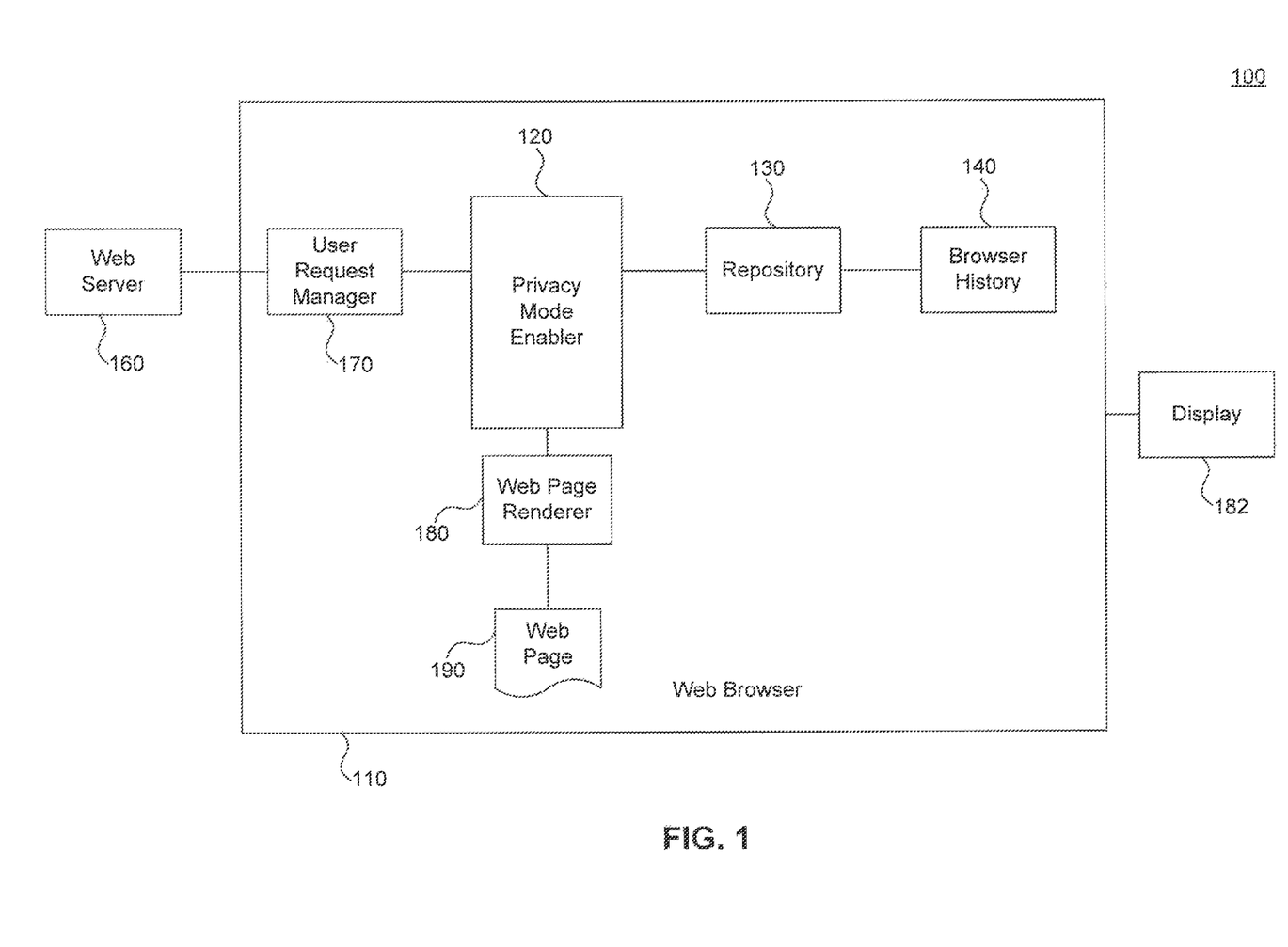
FIG. 1 illustrates an example web browser system architecture, according to an embodiment.

FIG. 1 shows an illustration of an exemplary web browser system architecture 100 in which embodiments can be implemented. Web browser system architecture 100 includes a web browser 110 and web server 160. Web browser 110 includes a user request manager 170, a privacy mode enabler 120, a repository 130, a browser history 140, a web page renderer 180, a display 182, and a web page 190. Although web browser system architecture 100 is described herein with reference to one web browser and one web server, one of skill in the art will recognize that web browser system architecture 100 may also include more than one web browser and more than one web server.

Web browser 110 can include software applications that allow a user to view or download content that is available on a network, such as on a website on the World Wide Web. Content may include text, files, images, audio, video and personal communications. Web page 190 may be generated using one or more browser-supported languages including, but are not limited to, JavaScript, VBScript, Hyper Text Markup Language (HTML), or any other type of language for writing web pages. Web page 190 may be served over the network using one or more servers as may be necessary. The location of each web page may be identified by a location address, such as a Uniform Resource Locator (URL). The URL can be entered into a web address field of web browser 110 by the user in order to navigate to the particular web page corresponding to the URL.

Web server 160 can be, for example, and without limitation, a telecommunications server, a web server, or other type of database server. Web server 160 may contain web applications which generate content in response to an HTTP request. The web server packages the generated content and serves the content to a client (not shown) in the form of an HTTP response. Web server 160 is a software component that responds to an HTTP request with an HTTP reply. As illustrative examples, web server 160 may be, without limitation, Apache HTTP Server, Apache Tomcat, Microsoft Internet Information Server, JBoss Application Server, WebLogic Application Server, or Sun Java System Web Server. Web server 160 may serve content such as hypertext markup language (HTML), extendable markup language (XML), documents, videos, images, multimedia features, or any combination thereof. This example is strictly illustrative and does not limit the scope of the present disclosure.

Web browser 110 can run on any computing device. Similarly, web server 160 can be implemented using any computing device capable of serving data to a client. Examples of computing devices include, but are not limited to, a central processing unit, an application-specific integrated circuit, a computer, workstation, distributed computing system, computer cluster, embedded system, stand-alone electronic device, networked device, mobile device (e.g. mobile phone, smart phone, personal digital assistant (PDA), navigation device, tablet or mobile computing device), rack server, set-top box, or other type of computer system having at least one processor and memory. A computing process performed by a clustered computing environment or server farm may be carried out across multiple processors located at the same or different locations. Such a computing device may include software, firmware, hardware, or a combination thereof. Software may include one or more applications and an operating system. Hardware can include, but is not limited to, a processor, memory and user interface display.

The user requests web page 190 by placing the request to user request manager 170. In an embodiment, the user places the request for web page 190 to user request manager 170 by selecting or typing a website address associated with web page 190 that is stored on web server 160. In response to the request, web server 160 delivers web page 190 to user request manager 170.

Web browser 110 may use a number of one or more well-known communication protocols and standards to obtain or manage content flow. Web browser 110 may primarily use hypertext transfer protocol (HTTP) to fetch content and web pages. HTTP is an application-level protocol providing basic request/response semantics.

HTTP can be used for requesting and retrieving objects from a server. Web browser 110 may send an HTTP request, such as a request for web page 190, to web server 160 over a network or combination of networks such as the Internet. Web server 160 receives the HTTP request and returns an HTTP response, such as content for the requested web page. When web browser 110 receives web page 190, web browser 110 can render web page 190 for the user. For example, web page renderer 180 can render the web page 190 for viewing by a user on a display 182. Display 182 can be any type of display device including, but are not limited to, a touchscreen display, a cathode ray tube (CRT) monitor, or liquid crystal display (LCD) screen. As would be apparent to a person skilled in the relevant art given this description, the user can also interact with web browser 110 to perform various tasks such as, for example, directing web browser 110 to different web pages. Web browser 110 receives user input from one or more input devices (not shown), such as, for example, a mouse, keyboard, or touch screen.

Web server 160 helps deliver resources to web browser 110. A resource is any data that can be provided over the network. The resource is identified by a resource address that is associated with each resource. Resources include HTML pages, such as web page 190, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as JavaScript scripts). In an embodiment, web server 160 helps deliver resources to web browser 110 that make up web page 190.

Resources encountered by the user when operating web browser 110 may be recorded in browser history 140 of web browser 110. Resources recorded in browser history 140 may include but are not limited to the browsing history of the web pages encountered by the user, such as web page 190, while operating web browser 110. Resources recorded in browser history 140 may also include but are not limited to images, videos, text and any other resources encountered by the user while operating web browser 110. Resources recorded in browser history 140 may also include but are not limited to images, videos, text and any other resources downloaded by the user while operating web browser 110. Resources included in browser history 140 may be stored by web browser 110 in repository 130. Repository 130 may be any temporary and/or permanent storage location associated with web browser 110 such as but are not limited to a cache.

Resources recorded in browser history 140 and stored in repository 130 may be retrieved at a later date by the user and/or a third party. The resources encountered by the user while operating web browser 110 may be tracked so that the user's operation of web browser 110 may not remain private but rather can be made known by obtaining access to repository 130.

Privacy mode enabler 120 enables a privacy mode for web browser 110 to prevent the storage of resources recorded in browser history 140 and stored in repository 130. Privacy mode enabler 120 ensures that the resources encountered by the user as the user operates web browser 110 cannot later be discovered by a third party and provides privacy to the user as the user operates web browser 110.

The user may not realize at the time of opening web page 190 that the privacy mode should be activated but rather realizes after navigating web page 190 that the privacy mode should be activated. Further, the user may retroactively decide to activate the privacy mode after already opening and navigating web page 190. In an embodiment, privacy mode enabler 120 may automatically activate the privacy mode for web browser 110 so that the user is not required to manually activate the privacy mode. The privacy mode enabler 120 automatically activates the privacy mode as web page 190 is opened based on the content of web page 190. Privacy mode enabler 120 analyzes the content of web page 190 and determines whether web page 190 should automatically be opened in the privacy mode.

For example, the user enters a request into user request manager 170 to open web page 190. User request manager 170 requests web page 190 from web server 160. Web server 160 responds to the request with web page 190. Privacy mode enabler 120 evaluates the content of web page 190 and determines that web page 190 should be opened in privacy mode. After this automatic determination, web page renderer 180 then renders web page 190 and outputs for display to the user in a privacy mode. The resources that the user encounters including any identification of web page 190 itself while navigating web page 190 may not be recorded in browser history 140 and stored in repository 130 but rather remain private.

In another example, privacy mode enabler 120 evaluates the content of web page 190 and determines that web page 190 should not be opened in the privacy mode. Web page renderer 180 provides web page 190 to the user in a non-privacy mode. The resources that the user encounters including any identification of web page 190 itself while navigating web page 190 may be recorded in browser history 140 and stored in repository 130 and made available by accessing repository 130.

In a further example, the user may request that web page 190 be opened in non-privacy mode so that privacy mode enabler 120 does not evaluate the content of web page 190. Rather, web page 190 may be opened in the non-privacy mode regardless of the content of web page 190. In a further example, an option may be provided to the user to close web page 190 already opened in the privacy mode and open a second web page in non-privacy mode.

Privacy Mode Enabler

Figure 2:
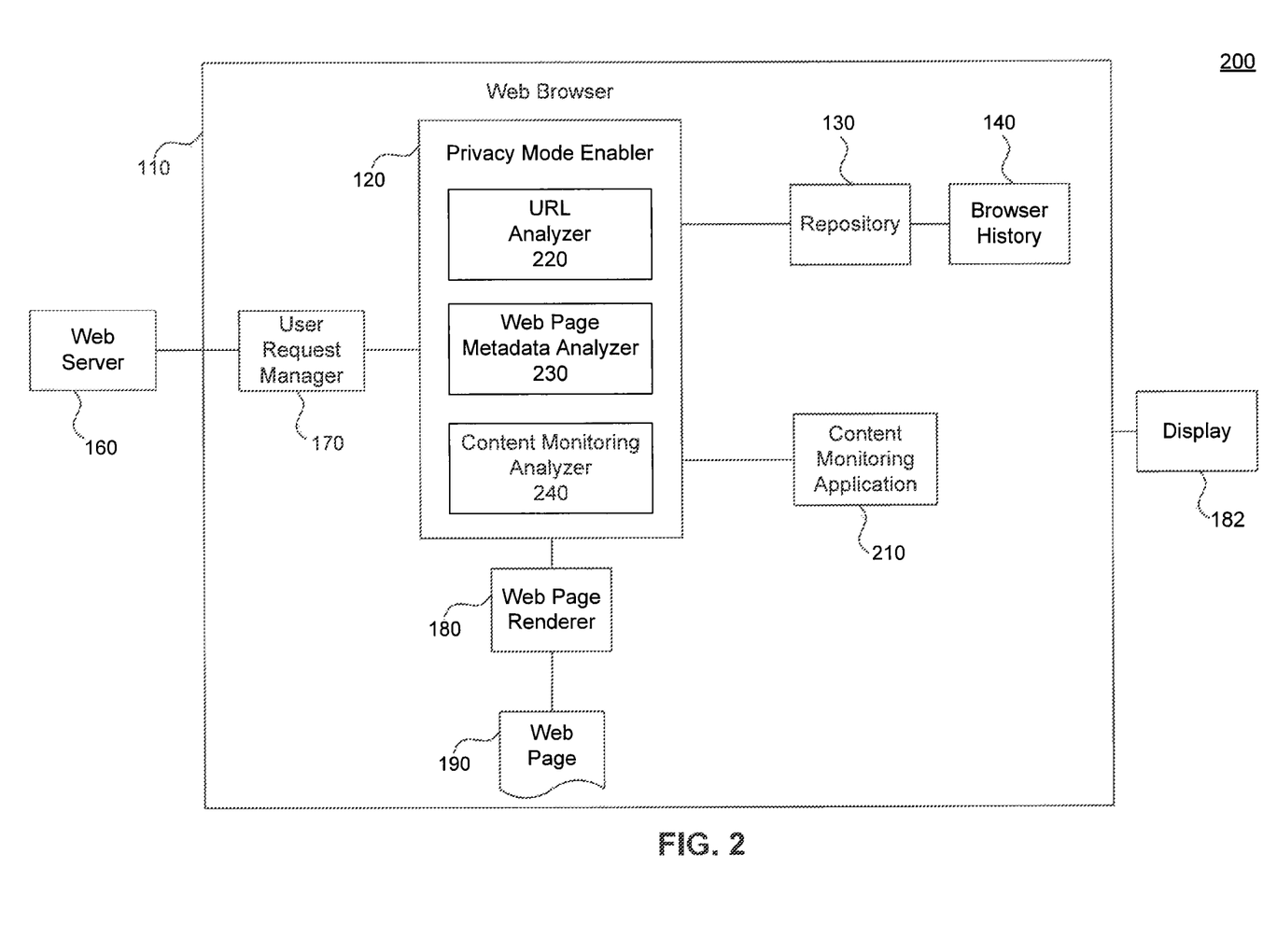
FIG. 2 depicts a more detailed view of an example privacy mode enabler in an example web browser system architecture, according to an embodiment.

FIG. 2 depicts a more detailed view of privacy mode enabler 120 in a block diagram of an exemplary web browser system architecture 200. Web browser system architecture 200 includes web browser 110, web server 160, and display 182. Web browser 110 includes privacy mode enabler 120, repository 130, browser history 140, user request manager 170, web page renderer 180, web page 190, and content monitoring application 210. Privacy mode enabler 120 includes a URL analyzer 220, a web page metadata analyzer 230, and a content monitoring analyzer 240.

Privacy mode enabler 120 may analyze the content of web page 190 and determine whether web page 190 should be automatically opened in the privacy mode. In an embodiment, privacy mode enabler 120 may analyze the content of web page 190 by analyzing identifiers associated with web page 190. Identifiers associated with web page 190 may identify whether web page 190 may include content that requires web page 190 to be automatically opened in the privacy mode. Identifiers associated with web page 190 may include but are not limited to metadata identifiers located in the metadata encoded in web page 190 and/or URL identifiers located in the URL for web page 190. For example, privacy mode enabler 120 may analyze the metadata of web page 190 to determine whether web page 190 should be automatically opened in the privacy mode. In doing so, metadata that identifies adult content may automatically trigger that web page 190 be automatically opened in the privacy mode. In another example, privacy mode enabler 120 may analyze the URL of web page 190 to determine whether web page 190 should be automatically opened in the privacy mode.

In an embodiment, identifiers that may identify whether web page 190 may include content that requires web page 190 to be automatically opened in the privacy mode may also be located elsewhere rather than being associated with web page 190. Identifiers may be local to the user. Identifiers may also be associated with the server and/or IP address that web page 190 may be retrieved from.

In an embodiment, privacy mode enabler 120 may analyze identifiers associated with web page 190, such as the metadata identifiers and/or the URL identifiers, to identify whether a privacy mode condition exists for web page 190. The existence of privacy mode conditions in web page 190 signify an increased likelihood that the user may require increased privacy settings. Privacy mode conditions may be associated with web pages that have an increased likelihood that the user who encounters those web pages may likely require that the browsing not be tracked.

In an embodiment, the privacy mode conditions may be defined by the user. For example, the user may define that any web page that requests the user's credit card number in the metadata should generate an increased requirement of privacy. In another embodiment, the privacy mode conditions may also be defined based on societal factors that generate an increased requirement of privacy. For example, web pages requiring enhanced security clearance to access the web pages may generate an increased requirement of privacy. In another embodiment, privacy mode conditions may be defined based on past history of web page 190 where web page 190 has previously been flagged as requiring increased privacy.

In an embodiment, privacy mode conditions may be identified in web page 190 itself. Specifically, privacy mode enabler 120 examines web page 190 for the privacy mode conditions. Privacy mode conditions may be identified in but are not limited to the metadata of web page 190 and/or the URL of web page 190. For example, privacy mode enabler 120 may analyze the metadata encoded in the web page to locate privacy mode conditions that may be embedded in the metadata for web page 190. Based on the privacy mode conditions discovered in the metadata of web page 190, privacy mode enabler 120 determines whether web page 190 should be automatically opened in the privacy mode. In another example, privacy mode enabler 120 may analyze the URL of web page 190 to identify privacy mode conditions. Based on the privacy mode conditions discovered in the URL of web page 190, privacy mode enabler 120 determines whether web page 190 should be automatically opened in the privacy mode.

As noted above, privacy mode conditions may be located in the metadata and/or the URL of web page 190. Privacy mode conditions located in the metadata of web page 190 may include resources for web page 190 that increase the likelihood that the user may require web page 190 be automatically opened in the privacy mode. For example, a privacy mode condition that may be located in the metadata of web page 190 may include but are not limited to a flagged condition. The flagged condition identifies that web page 190 has been previously blocked. A blocked web page is a web page that has been blocked from being opened on a web browser by certain users. A blocked web page may be blocked by a party such as a parent and/or employer who wishes to prohibit other users such as children and/or employees from opening the web page. An example of the flagged condition includes but is not limited to a Platform for Internet Content Selection (PICS) rating that uses metadata of web pages to block the web pages with the PICS rating from being opened by specific users.

The flagged condition identifying that web page 190 has been previously blocked increases the likelihood that the user that opens web page 190 may require increased privacy settings when navigating web page 190. Rather than require the user to manually activate the privacy mode when navigating web page 190 with the flagged condition, privacy mode enabler 120 may automatically activate the privacy mode when web page 190 is opened.

In an embodiment, web page metadata analyzer 230 analyzes the metadata identifiers located in the metadata of web page 190 to determine whether privacy mode conditions exist, such as the flagged condition. In such an embodiment, the user requests to open web page 190 by entering the request into user request manager 170. After web server 160 grants the request, user request manager 170 may load a first page of web page 190 from web server 160. Web page metadata analyzer 230 analyzes the header of the metadata of the first page to determine whether the flagged condition exists in the metadata. Metadata identifying web page 190 as having the flagged condition, such as the PICS rating, increases the likelihood that the user may require that web page 190 be automatically opened in the privacy mode. Web page renderer 180 automatically opens web page 190 with the flagged condition in the privacy mode for the user so that the user is not required to do so.

As noted above, privacy mode conditions may be located in the metadata and/or the URL of web page 190. Privacy mode conditions located in the URL of web page 190 may include resources for web page 190 that increase the likelihood that the user may require web page 190 be automatically opened in the privacy mode. For example, a privacy mode condition that may be located in the URL of web page 190 may include but are not limited to a previously visited condition. The previously visited condition identifies that web page 190 has been previously visited by the user in the privacy mode.

The previously visited condition identifying that web page 190 has been previously visited by the user in the privacy mode increases the likelihood that the user may require increased privacy settings when navigating web page 190. Rather than require the user to manually activate the privacy mode when navigating web page 190 with the previously visited condition, privacy mode enabler 120 may automatically activate the privacy mode when web page 190 is opened.

In another example, a privacy mode condition that may be located in the URL of web page 190 may include but are not limited to a mature content condition. The mature content condition identifies that web page 190 includes mature content. Like the previously visited condition, the mature content condition identifying that web page 190 includes mature content may require increased privacy settings when navigating web page 190. Rather than require the user to manually activate the privacy mode when navigating web page 190 with the mature content condition, privacy mode enabler 120 may automatically activate the privacy mode when web page 190 is opened.

In an embodiment, URL analyzer 220 may analyze the URL identifiers located in the URL of web page 190 to determine whether privacy mode conditions exist, such as the previously visited condition and/or the mature content condition. As noted above, identifiers located in the URL of web page 190 may identify privacy mode conditions for web page 190 requiring that web page 190 be automatically opened into the privacy mode. The URL identifiers may include but are not limited to the URL in its entirety or portions of the URL such as the suffix of the URL.

For example, the URL in its entirety may identify the privacy mode condition that includes but is not limited to the previously visited condition. The previously visited condition identifies that the user has previously visited web page 190 in the privacy mode. URL analyzer 220 parses the URL and compares the URL in its entirety to a stored URL in repository 130. The stored URL in repository 130 is a URL for a web page that the user previously opened in the privacy mode. The URL analyzer 220 determines whether the URL in its entirety matches the stored URL for the web page previously opened by the user in the privacy mode. A match indicates that web page 190 has been previously opened in the privacy mode requiring that web page 190 be automatically opened in the privacy mode once again. In a further example, URL analyzer 220 parses the URL to identify the portion of the URL as the URL identifier identifying the previously visited condition. URL analyzer 220 compares the portion of the URL to the stored URL where a match indicates that web page 190 has been previously opened in the privacy mode.

In another example, a portion of the URL may identify a privacy condition that includes but is not limited to the mature content condition. The mature content condition identifies that web page 190 includes mature content. URL analyzer 220 parses the URL to identify the portion of the URL as the URL identifier that identifies the mature content condition. URL analyzer 220 compares the portion of the URL to a stored portion in repository 130. The stored portion in repository 130 is a portion of a URL for a web page that identifies the web page as having mature content. The URL analyzer determines whether the portion of the URL matches the stored portion for the web page having mature content. A match indicates that web page 190 includes mature content requiring that web page 190 be automatically opened in the privacy mode.

In a further example, the suffix of the URL may identify a privacy condition that includes but is not limited to the mature content condition. The URL analyzer 220 parses the URL for the suffix of the URL and compares the suffix of the URL for web page 190 to a stored suffix in repository 130. The stored suffix in repository 130 is a suffix for a web page that identifies the web page as having mature content. If the stored suffix in repository 130 matches the suffix for the URL of web page 190, then URL analyzer 220 flags web page 190 as having mature content requiring that web page 190 be automatically opened in the privacy mode.

In a further example, the suffix of the URL for web page 190 may be .xxx representing that web page 190 may include mature content. The URL analyzer 220 parses the URL for the .xxx suffix and compares the .xxx suffix of the URL for web page 190 to the suffixes stored in repository 130. If repository 130 includes the .xxx suffix, then URL analyzer 220 flags web page 190 as having mature content requiring that web page 190 be automatically opened in the privacy mode.

In an embodiment, privacy mode conditions such as but not limited to the previously visited condition and/or the mature content condition may also be identified in the metadata for web page 190. Web page metadata analyzer 230 may analyze the metadata for web page 190 to identify the previously visited condition and/or the mature content condition in a similar fashion as URL analyzer 220.

As noted above, privacy mode conditions may be located in the metadata and/or the URL of web page 190. Privacy mode conditions identified in the URL of web page 190 may include resources for web page 190 that increase the likelihood that the user may require web page 190 be automatically opened in the privacy mode. For example, a privacy mode condition that may be identified in the URL of web page 190 may include but are not limited to a dynamic lookup service condition.

The dynamic lookup service condition identifies that web page 190 has been previously filtered by a dynamic lookup service. The dynamic lookup service may be an application that filters web pages so that web pages with specified conditions do not become the results of a search executed by the user on a web browser. For example, the dynamic lookup service may filter web pages that include mature content so that those web pages do not appear as results after the user has executed a search on the web browser.

The dynamic lookup service condition identifying that web page 190 has been previously filtered by a dynamic lookup service increases the likelihood that the user may require increased privacy settings when navigating web page 190. Rather than require the user to manually activate the privacy mode when activating web page 190 with the dynamic lookup service condition, privacy mode enabler 120 may automatically activate the privacy mode when web page 190 is opened.

In an embodiment, content monitoring analyzer 240 analyzes the URL identifiers located in the URL of web page 190 to determine whether privacy mode conditions exist, such as the dynamic lookup service condition. In such an embodiment, content monitoring analyzer 240 compares the URL to a filtered URL in content monitoring application 210. Content monitoring application 210 may execute the dynamic lookup service. Content monitoring application 210 may filter web pages based on content so that those filtered web pages do not return as search results for a search executed by the user. The filtered URL is a URL for a web page filtered by content monitoring application 210 to not return as the search result. Content monitoring analyzer 240 determines whether the URL for web page 190 matches the filtered URL for the web page filtered by content monitoring application 210. A match indicates that web page 190 has been previously filtered by content monitoring application 210 to not return as a search result requiring that web page 190 be automatically opened in the privacy mode.

For example, content monitoring application 210 may filter web pages that include resources of mature content from appearing as the search result for a search executed by the user on web browser 110. Content monitoring application 210 may store the URL for each web page filtered because of having resources of mature content. Content monitoring analyzer 240 compares the URL of web page 190 with each URL stored in content monitoring application 210 as having been filtered. A match indicates that web page 190 has been previously filtered as having resources of mature content requiring that web page 190 be automatically opened in the privacy mode.

Method 300

Figure 3:
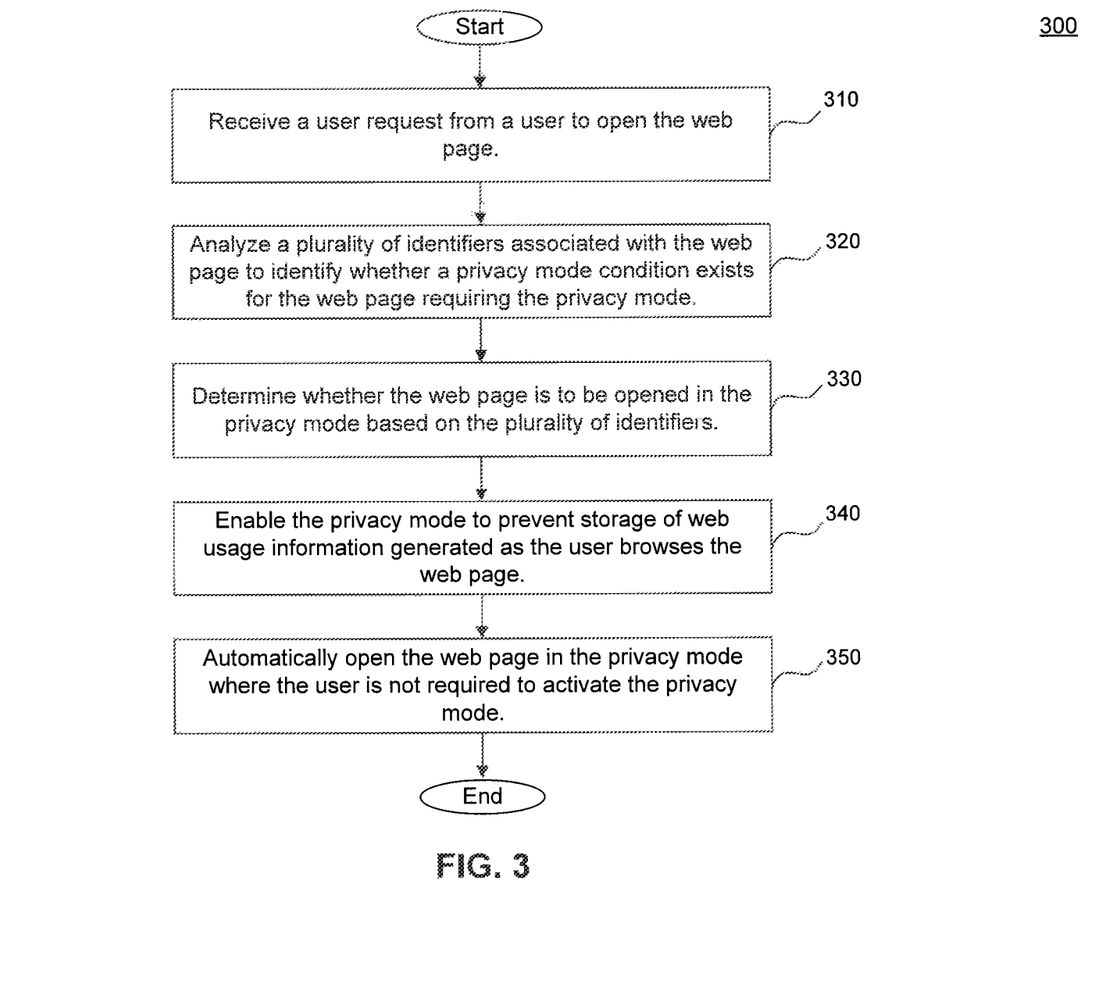
FIG. 3 is a flowchart illustrating an example aspect of operation, according to an embodiment.

FIG. 3 is a flowchart showing an example method 300 of automatically enabling private browsing of a web page. As shown in FIG. 3, method 300 begins at stage 310, when a user request is received to open the web page. For example, as shown in FIG. 1, user request manager 170 receives a user request to open web page 190 when the user enters the request into user request manager 170. Stage 310 can be performed by, for example, user request manager 170.

At stage 320, a plurality of identifiers associated with the web page is analyzed to identify whether a privacy mode condition exists for the web page requiring the privacy mode. For example, as shown in FIG. 1, privacy mode enabler 120 analyzes a plurality of identifiers associated with the web page 190 to identify whether a privacy mode condition exists for web page 190 requiring the privacy mode. Stage 320 can be performed by, for example, privacy mode enabler 120.

At stage 330, the determination is made as to whether the web page is to be opened in the privacy mode based on the plurality of identifiers. For example, as shown in FIG. 1, privacy mode enabler 120 determines whether web page 190 is to be opened in the privacy mode based on the plurality of identifiers. Stage 330 can be performed by, for example, privacy mode enabler 120.

At stage 340, the privacy mode is enabled for the web page to prevent storage of web usage information generated as the user browses the web page. For example, as shown in FIG. 1, privacy mode enabler 120 enables the privacy mode to prevent storage of web usage information generated as the user browses web page 190. Stage 340 can be performed by, for example, privacy mode enabler 120.

At stage 350, the web page is automatically opened in the privacy mode where the user is not required to activate the privacy mode. For example, as shown in FIG. 1, web browser 110 automatically opens web page 190 in the privacy mode where the user is not required to activate the privacy mode. Stage 350 can be performed by, for example, web browser 110.

Embodiments can work with software, hardware, and/or operating system implementations other than those described herein. Any software, hardware, and operating system implementations suitable for performing the functions described herein can be used. Embodiments are applicable to both a client and to a server or a combination of both.

Exemplary Computer System

Figure 4:
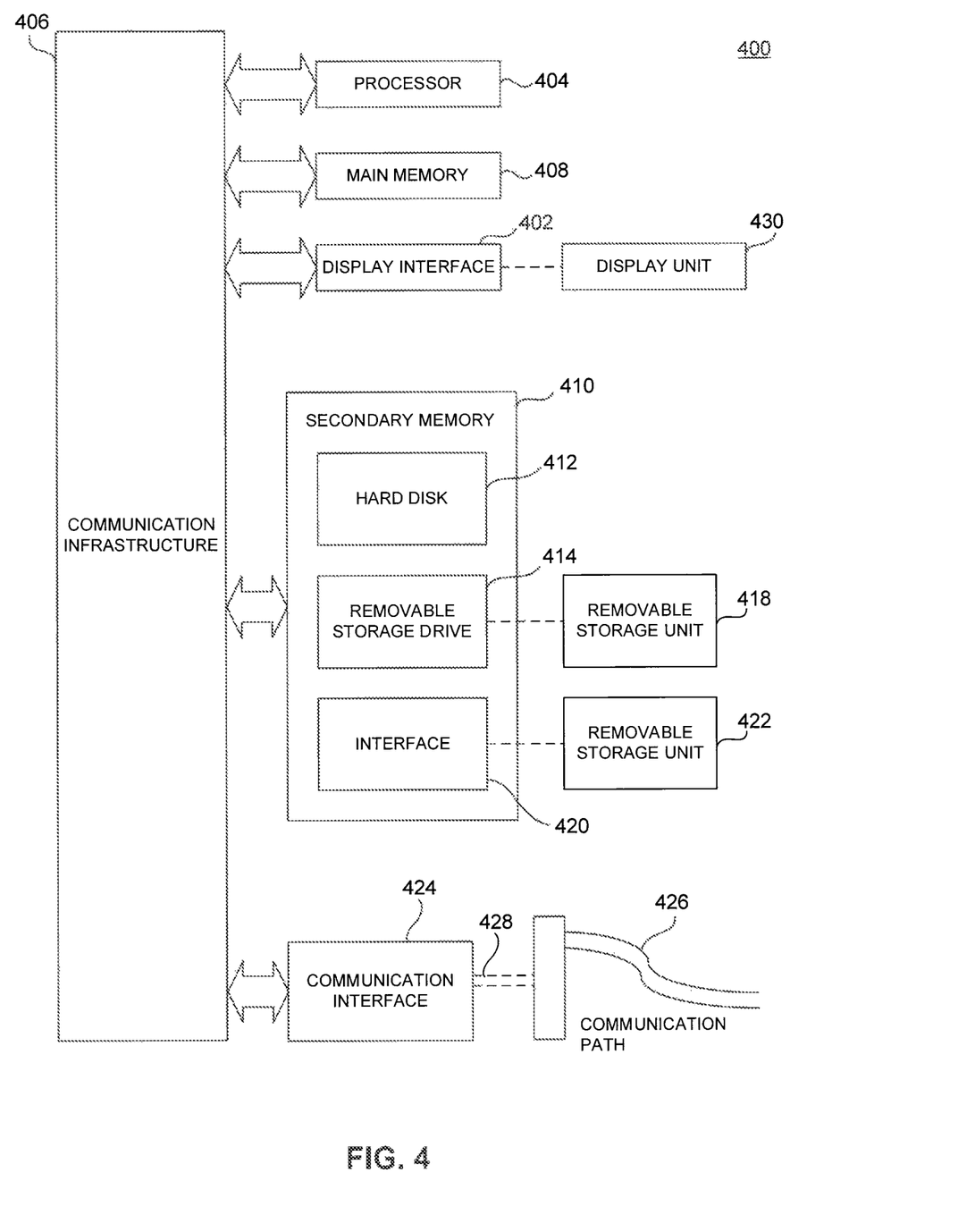
FIG. 4 is a system diagram that can be used to implement embodiments described herein.

FIG. 4 illustrates an example computer system 400 in which embodiments of the present invention, or portions thereof, may be implemented as computer-readable code. For example, web browser 110 may be implemented in computer system 400 using hardware, software, firmware, tangible computer readable media having instructions stored thereon, or a combination thereof and may be implemented in one or more computer systems or other processing systems. Hardware, software, or any combination of such may embody any of the modules and components in FIG. 1 and FIG. 2.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 400. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 404 may be a special purpose or a general purpose processor device. As will be appreciated by persons skilled in the relevant art, processor device 404 may also be a single processor in a multi-core/multiprocessor system, such system operating alone, or in a cluster of computing devices operating in a cluster or server farm. Processor device 404 is connected to a communication infrastructure 406, for example, a bus, message queue, network, or multi-core message-passing scheme.

Computer system 400 also includes a main memory 408, for example, random access memory (RAM), and may also include a secondary memory 410. Secondary memory 410 may include, for example, a hard disk drive 412, removable storage drive 414. Removable storage drive 414 may comprise a floppy disk drive, a magnetic tape drive, an optical disk drive, a flash memory, or the like. The removable storage drive 414 reads from and/or writes to a removable storage unit 418 in a well-known manner. Removable storage unit 418 may comprise a floppy disk, magnetic tape, optical disk, etc. which is read by and written to by removable storage drive 414. As will be appreciated by persons skilled in the relevant art, removable storage unit 418 includes a computer usable storage medium having stored therein computer software and/or data.

In alternative implementations, secondary memory 410 may include other similar means for allowing computer programs or other instructions to be loaded into computer system 400. Such means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 400.

Computer system 400 may also include a communications interface 424. Communications interface 424 allows software and data to be transferred between computer system 400 and external devices. Communications interface 424 may include a modem, a network interface (such as an Ethernet card), a communications port, a PCMCIA slot and card, or the like. Software and data transferred via communications interface 424 may be in the form of signals, which may be electronic, electromagnetic, optical, or other signals capable of being received by communications interface 424. These signals may be provided to communications interface 424 via a communications path 426.

In this document, the terms "computer program medium" and "computer usable medium" are used to generally refer to media such as removable storage unit 418, removable storage unit 422, and a hard disk installed in hard disk drive 412. Computer program medium and computer usable medium may also refer to memories, such as main memory 408 and secondary memory 410, which may be memory semiconductors (e.g. DRAMs, etc.).

Computer programs (also called computer control logic) are stored in main memory 408 and/or secondary memory 410. Computer programs may also be received via communications interface 424. Such computer programs, when executed, enable computer system 400 to implement the present invention as discussed herein. In particular, the computer programs, when executed, enable processor device 404 to implement the processes of the present invention, such as the stages in the method illustrated by flowchart 300 of FIG. 3 discussed above. Accordingly, such computer programs represent controllers of the computer system 400. Where an embodiment is implemented using software, the software may be stored in a computer program product and loaded into computer system 400 using removable storage drive 414, interface 420, and hard disk drive 412, or communications interface 424.

CONCLUSION

The brief Summary and Abstract sections may set forth one or more but not all example embodiments and thus are not intended to limit the scope of the present disclosure and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described example embodiments, but should be defined only in accordance with the following claims and their equivalents.

What is claimed is:

1. A computer implemented method for automatically enabling private browsing of a web page in a privacy mode, comprising:
   receiving, by a browser while not operating in a privacy mode, a user request from a user to open the web page;
   determining, by the browser as the user browses to the web page, whether the web page was previously filtered to not appear in search results returned in response to a search executed by the user;
   continuing to operate, by the browser, in a non-privacy mode when the determining determines that the web page was not previously filtered;
   dynamically enabling, by the browser, the privacy mode of the browser without user intervention when the determining determines the web page was previously filtered to prevent storage of web page usage information generated as the user browses the web page; and
   automatically opening, by the browser, the web page in the dynamically enabled privacy mode.

2. The method of claim 1, further comprising:
   providing an option to close the web page operating in the privacy mode.

3. The method of claim 2, further comprising:
   providing an option to open the web page in a non-privacy mode to enable the web page usage information generated as the user browses the web page to be stored.

4. The method of claim 1, wherein the determining further comprises:
   comparing at least a portion of a uniform resource locator (URL) for the web page to a stored URL.

5. The method of claim 4, wherein the determining further comprises: comparing the URL to a content monitoring URL provided by a content monitoring application.

6. The method of claim 1, wherein determining whether the web page was previously filtered comprises:

determining that the web page has been previously filtered by a dynamic lookup service.

7. The method of claim 6, wherein the dynamic lookup service filters web pages that include mature content so that one or more filtered web pages do not appear as search results.

8. The method of claim 1, wherein the web page was previously filtered because the web page was previously determined to contain mature content.

9. The method of claim 1, further comprising:
providing one or more stored uniform resource locators designating web pages previously opened by the web browser in the privacy mode; and
comparing at least a portion of a uniform resource locator corresponding to the web page to the stored uniform resource locators to determine whether the web page was previously visited in the privacy mode.

10. The method of claim 1, further comprising:
analyzing a plurality of identifiers associated with the web page, the plurality of identifiers configured to identify that a privacy mode condition from a plurality of privacy mode conditions exists for the web page.

11. A system for automatically enabling private browsing of a web page in a privacy mode, comprising:
a user request manager operating on a computing device and configured to receive, while not operating in a privacy mode, a user request from a user to open the web page;
a privacy mode enabler operating on the computing device and configured to:
determine, as the user browses to the web page, whether the web page was previously filtered to not appear in search results returned in response to a search executed by the user, operate in a non-privacy mode when the privacy mode enabler determines that the web page was not previously filtered,
dynamically enable the privacy mode without user intervention when the privacy mode enabler determines the web page was previously filtered to prevent storage of web page usage information generated as the user browses the web page; and
a web page renderer operating on the computing device and configured to automatically open the web page in the dynamically enabled privacy mode,
wherein the user request manager, the privacy mode enabler, and the web page renderer are implemented in a processing device.

12. The system of claim 11, wherein the privacy mode enabler is further configured to:
analyze a plurality of identifiers associated with the web page, the plurality of identifiers configured to identify that a privacy mode condition from a plurality of privacy mode conditions exists for the web page requiring the privacy mode.

13. The system of claim 12, wherein the plurality of identifiers is configured to be identifiable from a web page resource that the web page is being obtained from.

14. The system of claim 12, wherein the plurality of identifiers is configured to be identifiable from a local location relative to the user.

15. The system of claim 11, further comprising: a privacy mode terminator implemented in the processing device and configured to close the web page operating in the privacy mode.

16. The system of claim 15, further comprising: a non-privacy mode provider in the processing device and configured to open the web page in a non-privacy mode to enable the web page usage information generated as the user browses the web page to be stored.

17. The system of claim 11, wherein the privacy mode enabler further comprises:
a uniform resource locator (URL) analyzer configured to analyze a URL for the webpage for a URL identifier provided in a URL for the web page by comparing the URL to a stored URL, wherein the stored URL is configured to include the URL identifier.

18. The system of claim 11, wherein the privacy mode enabler further comprises:
a content monitoring analyzer configured to analyze a URL for the webpage for a URL identifier by comparing the URL to a content monitoring URL, the content monitoring URL provided by a content monitoring application, the content monitoring application configured to filter web pages based on previously identified content so that filtered web pages do not return as search results.

19. The system of claim 11, wherein the privacy mode enabler further comprises:
a web page metadata analyzer configured to analyze web page metadata encoded in the web page to determine whether the web page metadata includes the web page metadata identifier.

20. A non-transitory computer storage medium encoded with a computer program, the program comprising instructions that when executed by one or more processors cause the one or more processors to perform operations, comprising:
receiving, while not operating in a privacy mode, a user request from a user to open a web page;
determining, as the user browses to the web page, whether the web page was previously filtered to not appear in search results returned in response to a search executed by the user;
continuing to operate in a non-privacy mode when the determining determines that the web page was previously filtered;
dynamically enabling the privacy mode of the browser without user intervention when the determining determines the web page was previously filtered to prevent storage of web page usage information generated as the user browses the web page; and
automatically opening the web page in the dynamically enabled privacy mode.

* * * * *